(12) United States Patent
Gilde et al.

(10) Patent No.: US 7,020,611 B2
(45) Date of Patent: Mar. 28, 2006

(54) USER INTERFACE SELECTABLE REAL TIME INFORMATION DELIVERY SYSTEM AND METHOD

(75) Inventors: Hans Gilde, Brooklyn, NY (US); Steele Arbeeny, Guttenberg, NJ (US)

(73) Assignee: Ameritrade IP Company, Inc., (US)

( * ) Notice: Subject to any disclaimer, the term of this patent is extended or adjusted under 35 U.S.C. 154(b) by 0 days.

(21) Appl. No.: 10/274,685

(22) Filed: Oct. 21, 2002

(65) Prior Publication Data

US 2003/0040912 A1    Feb. 27, 2003

Related U.S. Application Data

(63) Continuation of application No. 10/081,159, filed on Feb. 21, 2002, now abandoned.

(60) Provisional application No. 60/270,358, filed on Feb. 21, 2001.

(51) Int. Cl.
*G10L 21/00* (2006.01)

(52) U.S. Cl. .................. 704/270.1; 704/270; 704/275; 715/516; 715/517; 709/203; 709/201; 707/101; 707/102; 705/26; 705/27; 705/31

(58) Field of Classification Search ............... 345/804, 345/805, 968; 704/270.1, 235, 260, 270, 704/275; 715/517, 516, 730; 709/200, 203; 707/102, 101; 705/26, 27, 31, 35
See application file for complete search history.

(56) References Cited

U.S. PATENT DOCUMENTS

| | | | | |
|---|---|---|---|---|
| 5,555,343 A | * | 9/1996 | Luther | 704/260 |
| 5,587,902 A | * | 12/1996 | Kugimiya | 704/2 |
| 5,594,809 A | * | 1/1997 | Kopec et al. | 382/161 |
| 5,732,216 A | * | 3/1998 | Logan et al. | 709/203 |
| 5,748,186 A | * | 5/1998 | Raman | 715/500.1 |
| 5,915,001 A | * | 6/1999 | Uppaluru | 379/88.22 |
| 5,970,499 A | * | 10/1999 | Smith | 707/104.1 |
| 6,055,522 A | * | 4/2000 | Krishna | 715/517 |
| 6,085,161 A | * | 7/2000 | MacKenty et al. | 704/270 |
| 6,185,587 B1 | * | 2/2001 | Bernardo | 707/513 |
| 6,199,099 B1 | * | 3/2001 | Gershman et al. | 709/203 |
| 6,446,076 B1 | * | 9/2002 | Burkey et al. | 707/102 |
| 6,453,290 B1 | * | 9/2002 | Jochumson | 704/231 |
| 6,658,093 B1 | * | 12/2003 | Langseth et al. | 379/88.17 |
| 2001/0013001 A1 | * | 8/2001 | Brown | 704/270.1 |
| 2001/0039493 A1 | * | 11/2001 | Pustejovsky | 704/235 |
| 2002/0103858 A1 | * | 8/2002 | Bracewell | 709/203 |

* cited by examiner

Primary Examiner—Vijay Chawan
(74) Attorney, Agent, or Firm—Gibbons, Del Deo, Doloan, Griffinger and Vecchione

(57) ABSTRACT

An information delivery system including a client device and server interconnected by a network passes data files in accordance with a well known protocol. The server creates an audio version of a displayed page associated with a first data file. The audio version includes information from the first data file and other items, so that the information is presented in the form of conversation-like natural speech. The server merges the audio version and the data file to produce a second data file and delivers the second data file to the client device. Advantageously, the client device includes a speech synthesizer engine and a display so that the data file can be viewed using the first data file and/or heard by a user using the audio version, both included in the second data file.

22 Claims, 6 Drawing Sheets

810        820       830

Good <u>morning, Tom</u>! Welcome to ___.com!
As of <u>two twenty-three AM</u> TODAY, <u>August 23, 2000</u>, for account number <u>4RX221599</u>: Your long market value is <u>66,420</u> dollars and <u>90</u> cents. — 850
— 840

Your cash balance is <u>12,309</u> dollars and <u>51</u> cents, and your total equity is <u>78,730</u> dollars and <u>41</u> cents.

Your have <u>0</u> dollars and <u>0</u> cents in your market account.

In total, your account value is <u>78,730</u> dollars and <u>41</u> cents, up <u>4325.44 cents from "yesterday"</u> closing balance of <u>1,820</u> dollars and <u>17</u> cents.

[If one or more of the below line items is non-zero:]
Your cash purchasing limit is <u>0</u> dollars and <u>0</u> cents, and your margin buying power is <u>0</u> dollars and <u>0</u> cents. Please note that these figures are based on the previous trading day's close and are updated only when trading activity occurs.

[If a disclaimer about inability to get quotes for certain securities appears at the bottom of the screen:]
We are unable to obtain quotes for ___ in your account, so we have used <u>its closing price</u> in calculating account value. Please refer to your screen for the specific securities.

Please note the important disclaimers on your Account Value screen. If you have any questions, feel free to call us, email us, or take advantage of live, online customer help, through our iAnswer. Have a good [day].

Fig. 4

USER INTERFACE SELECTABLE REAL TIME INFORMATION DELIVERY SYSTEM AND METHOD

CROSS REFERENCE TO RELATED APPLICATION

This application claims priority from U.S. application Ser. No. 10/081,159 filed on Feb. 21, 2002, now abandoned which claims priority from U.S. Provisional Application No. 60,270,358 filed on 5 Feb. 21, 2001. Both are hereby incorporated by reference.

FIELD OF THE INVENTION

The present invention generally relates to an information delivery system, and more particularly to a system that generates a user-friendly version of a first data file, wherein the first data file is suited for one type of user interface and the user-friendly version is suited for a different type of user interface. Both versions are simultaneously delivered to a user, so that the user can retrieve the same information from two different types of user interface.

BACKGROUND OF THE INVENTION

The Internet provides a robust facility for providing information on diverse topics. For many topics, such as account information and stock quotes, the information consists primarily of tables or lists of numbers and symbols, and usually in a format that is suited only for a graphic display in a user device, such as a monitor attached to a computer. Generally, a service provider does not provide a voice translation of the displayed information. Thus, the user has no option to listen to such information even if the user device is equipped with a speaker.

A possible solution is to use a text-to-speech converter. However, unlike news story for example, this type of information is not in the format of straight text, i.e., not in the form of conversation-like natural speech or acontextual. As a result, the converted audio may be incomprehensible. Thus, there is a need to develop a system and method for enabling a user to listen to such information in the form of conversation-like audio.

SUMMARY OF THE INVENTION

A system according to the principles of the invention enables users to retrieve information from different types of user interfaces. The information is originally saved in a format suitable for a particular type of user interface, such as video displays. The information is then converted to a different format suitable for a different type of user interface, such as an audio speaker. The converted format includes the information provided in the original format but also includes other elements, so that the information retrieved by the different type of user interface is tailored to natural human communication. For example, if the different type of user interface is an audio speaker, prefatory and other transitional phases may be added to communicate the information in a manner most closely resembling natural language speech.

A system according to the principles of the invention includes a client device connected to an information server via a network wherein the client device and server are adapted to pass data files (such as hypertext files) in accordance with a well known protocol (such as HyperText Transfer Protocol—"HTTP"). The server is further adapted to create data files suitable for a first type of user interface from data files suitable for a second but different type of user interface as requested by the client device. Such data files can be created in real-time and may contain either real-time information and/or historical information.

The system allows a user accessing the server via the client device to request and view the requested data files on the display of the client device. To provide this capability, the data file received by the client device is read using a well known markup language reader, such as a web or wap browser. Advantageously, the present invention further includes a speech synthesis engine installed on the client device adapted to convert information from the data file into an audio format.

In another embodiment of the present invention, the server is adapted to deliver data files containing information along with settings for controlling the operation of the speech synthesizer engine in the client device.

In another embodiment of the present invention, the server includes a storage device for storing the control settings of the speech synthesizer engine.

In yet another embodiment of the present invention, the server delivers data files containing information in both an audible and a visual format. The hypertext files further include a user interface for selecting access to the information in audible format.

In yet another embodiment, the server and client device may be configured to allow the client device to deliver unsolicited information in a data file. The user may pre-select whether the delivered information is provided in a visual and/or an audible format.

BRIEF DESCRIPTION OF THE DRAWINGS

A more complete understanding of the present invention may be obtained from consideration of the following description in conjunction with the drawings in which:

FIG. 4 shows an illustrative text version of the data file for the displayed page shown in FIG. 2;

DETAILED DESCRIPTION

Figure 1:
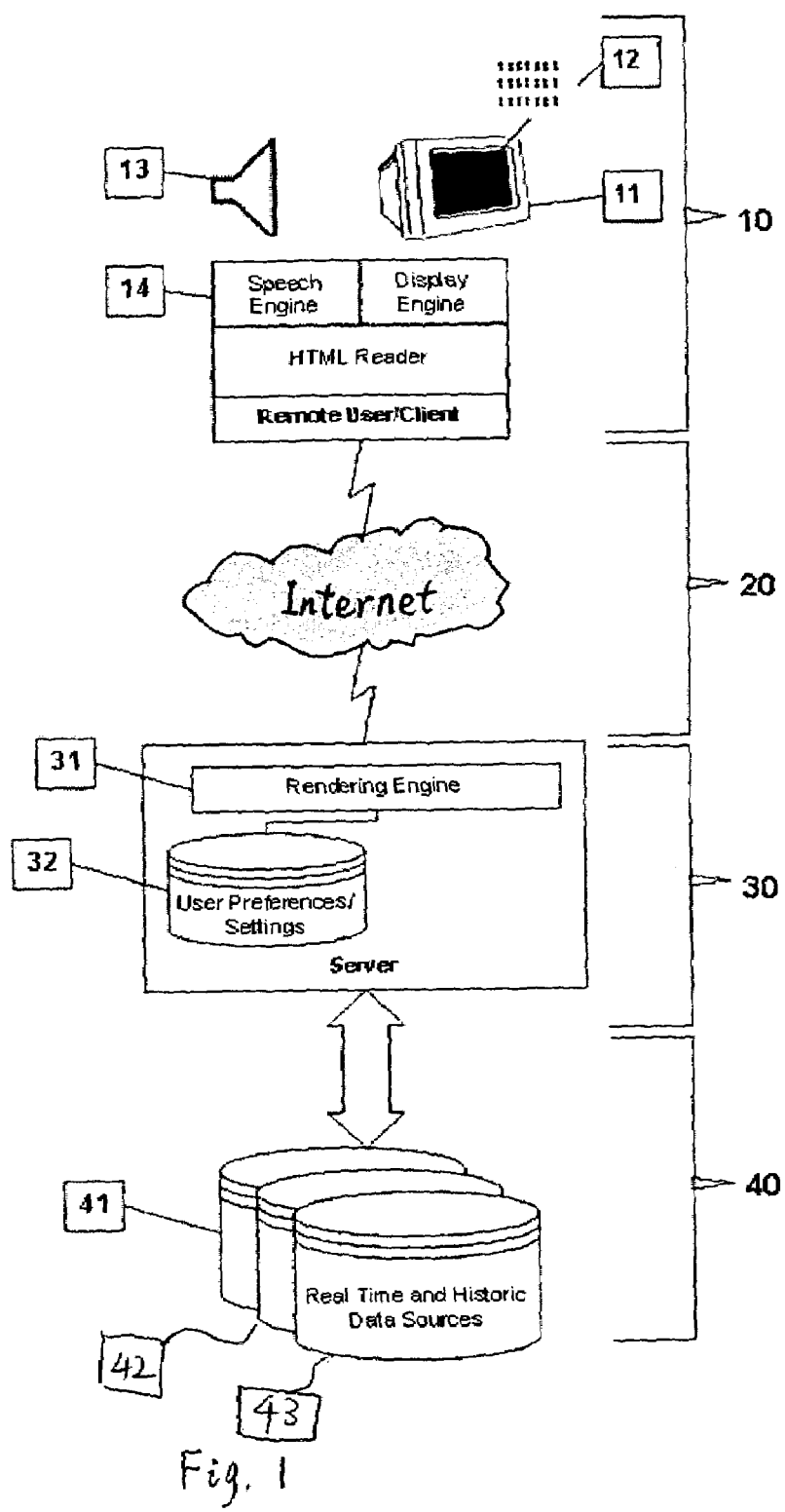
FIG. 1 is a functional diagram of an illustrative information delivery system in accordance with the present invention.

With reference to the FIG. 1, system 100 includes a client device 10 connected to an information server 30 via a network 20. The client device and server are adapted to pass data files in accordance with a well known protocol such as HyperText Transfer Protocol—"HTTP." Server 30 includes a markup language rendering engine 31, adapted to format information for delivery through network 20, and a client preference/settings database 32. Server 30 has access to additional real time and historic data sources 40, which, for example, include data sources 41–43. In the following illustration, the markup language is the HyperText Markup Language (HTML). The client device 10 includes a display 11. The server is further adapted to create HTML data files in real time as requested by the client device. Accordingly, a user, accessing the server via the client device, can request and view these real time HTML data files on display 11 using a HTML reader installed in the client device. The HTML reader passes the information in the HTML files to the graphic designated by reference numeral 12 in FIG. 1, so that the data files can be visually displayed in the graphic.

Advantageously, the present invention further includes a speech synthesis engine 14 installed on the client device. This engine is adapted to convert information from a HTML file into an audio format and comprises two layers. The first layer interfaces with an HTML compatible software program, such as a web browser, and retrieves any HTML file having an audio component from the browser and generates an audio output therefrom. The audio output is preferably in the form of text. The second layer is any speech application program interface ("SAPI") compatible program. One example of a SAPI compatible program is SAPI Version 5.0 distributed by Microsoft Corporation of Redmond, Wash., U.S.A. Reference numeral 14 indicates the audio output to speaker 13 of client device 10. If the audio output is in the form of text, a text-to-speech converter (not shown) included in the speech engine can be used to pronounce the text.

In another embodiment of the present invention, the server is adapted to deliver hypertext files containing information and control settings for operating the speech engine contained on the client device.

The server can include storage 32 for storing the control settings of the speech synthesizer.

In yet another embodiment of the present invention, the server delivers HTML files containing information in both an audible and a visual format. The hypertext files further include a user interface for selecting access to the information in an audible format.

The server and client device can be configured to provide for the delivery of unsolicited information in a HTML file. The unsolicited information as used herein is the information delivered to a user other than in response to an interactive request. Rather, the user may subscribe to a service available in the server and the server then delivers the information provided by that service when certain events have occurred. For example, the user may subscribe to a service that periodically supplies updated stock quotes for certain stocks selected by the user in an interval specified by the user. The user may pre-select whether the information is to be delivered to the user in a visual or an audible format. More particularly, the server and the client device are adapted to deliver hypertext files to the user wherein the information in such files is tailored to the user.

With reference to FIG. 1, the present invention utilizes a server connected via a network to a client device. The server and client device utilize software to communicate via the network using the HTTP protocol. Such protocol presently includes the ability to communicate files in HTML form.

Figure 2:
FIG. 2 illustrates a displayed page for the status of an account.

The present invention may be used on a server adapted to transmit information to a remote user in real time. While the information can include any kind of information; in the preferred embodiment of the invention, the server includes stock quote, transaction and current client account information, including real time reporting of user-selected stock market indicators. For example, FIG. 2 illustrates a page for reporting the status of an account. In the figure, element 510 is the account number; elements 520, 530, 540, 550, 560, and 570 are the long market value, the cash balance, the total equity, the money market account, the total account value, and the cash purchasing limit at the start of the day, respectively; elements 525, 535, 545, 555, 565, and 575 represent the current values of the set of parameters above; and element 580 is the margin buying power. A speak button 590 is also provided on the page. This speak button enables a user to request the voice translation of the page. The server includes an HTML rendering engine that is responsive to user requests and provides requested information in HTML format. Advantageously, the present system further includes a text-to-speech engine installed on the client device. The text-to-speech engine is configured by the user and such configuration information is stored on the server. Thus, a user having a tailored configuration can choose any client device having a text-to-speech engine and access their account according to their predetermined specifications.

The HTML rendering engine is responsive to a client device having a text-to-speech engine 14. In such case, the information delivered to the client device includes commands and information tailored for an audible format. The audio message will vary according to user, time of day and other real time information. An implementation may have the server application merging standard templates with customized user, data source and time of day information. When the HTML file is received, the information formatted for visual display is displayed by the client device using a conventional HTTP compatible browser and the information formatted for audio output is delivered to speech engine 14, which uses a text-to-speech converter.

Figure 3:
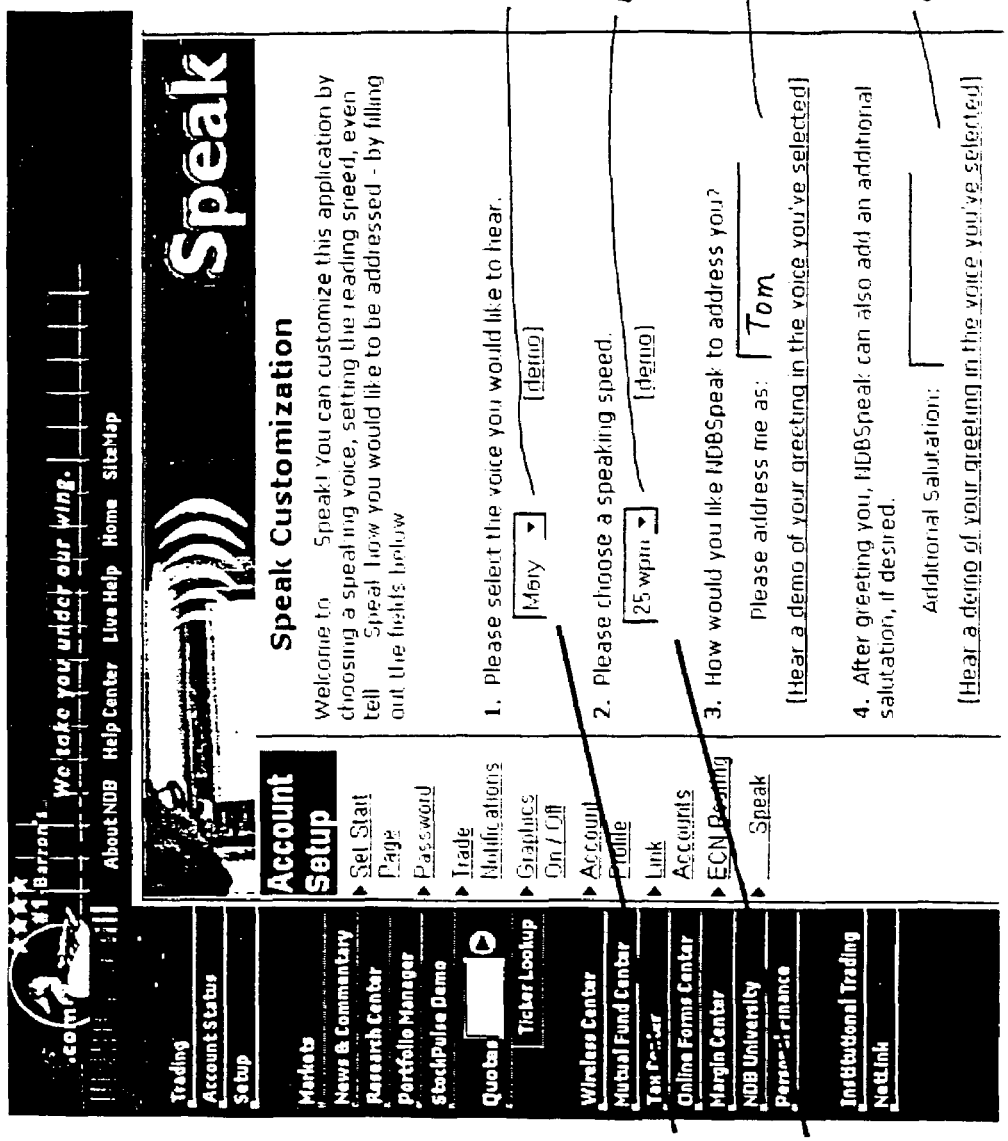
FIG. 3 shows an illustrative customization page according to the principles of the invention.

FIG. 3 illustrates the customization page provided by the server, so that a user can specify settings for the speech engine in the client device and set other user-specific preferences. In this example, a user is able to select a type of voice at block 610, the speaking speed at block 620, the way he wants to be addressed at block 630, and additional salutation at block 640. Here, the user selects the type of voice identified by "Mary" for used by the speech engine 4. He also specifies the speaking speed of 25 wpm (word per minute), and specifies "Tom" for addressing him. The user does not select additional salutation.

The use of the text-to-speech engine allows for the reporting of information to the user without requiring this user to focus on the display. Thus, the user can do other tasks away from the client device or operate their account in the background while doing other tasks.

It should be noted that information is delivered in a different way when delivered by audible format rather than by visual format. For example, additional prefatory phrases or other transitional phrases not required for a visual format are required for the audible format to communicate the information in a manner most closely resembling natural language speech. Natural language speech, for purposes of this application, is not limited to any particular natural language, e.g., English, German, French, etc., but refers to any natural language.

As an example, FIG. 4 illustrates the text created by the rendering engine 31 in the server from the account status page illustrated in FIG. 2. In FIG. 4, the underlined text items are variable items and those not underlined are fixed items. For example, item 810, "Good," is a fixed item. On the other hand, item 820 is a variable item. Its content depends on the time the user accesses his account information. In the illustration, the user accesses it in the morning, thus, the content of item 820 is "morning." If the user accesses it in the afternoon, the content would be "afternoon." Similarly, if the user accesses it in the evening, the content would be "evening."

The content of some of the variable items depends on user preferences set by the user through, for example, the customization page shown in FIG. 3. For example, item 830 is "Tom," the preference set by the user at block 630 on the customization page in FIG. 3. Some variable items are for the information such as the long term market value conveyed in the corresponding displayed page. For example, variable items 840 and 850 together represent the current long market value shown on the page for the account status in FIG. 2. Some of the fixed and variable items are optional. For example, the greetings at the first line may be omitted. The format in FIG. 4 is a template designed specifically for the data file associated with the displayed page shown in FIG. 2. A different displayed page should have a different template. These templates may be saved in database 32 or other databases (not shown). Other structures can be used in place of templates for performing the same function.

The text shown in FIG. 4 is preferably created when the user presses the speak button 590 on the page shown in FIG. 2. This text is merged with the HTML file representing the page shown in FIG. 2, and the merged HTML file is then delivered to the client device. The text portion in the merged HTML file is hidden from the display engine but can be retrieved and pronounced by the speech engine 14, so that the user may simultaneously listen to the content of the displayed page. In one embodiment, the server creates the text file but the text file is not merged with the data file and delivered to the client device until the user has pressed the speech button 590.

Figure 5:
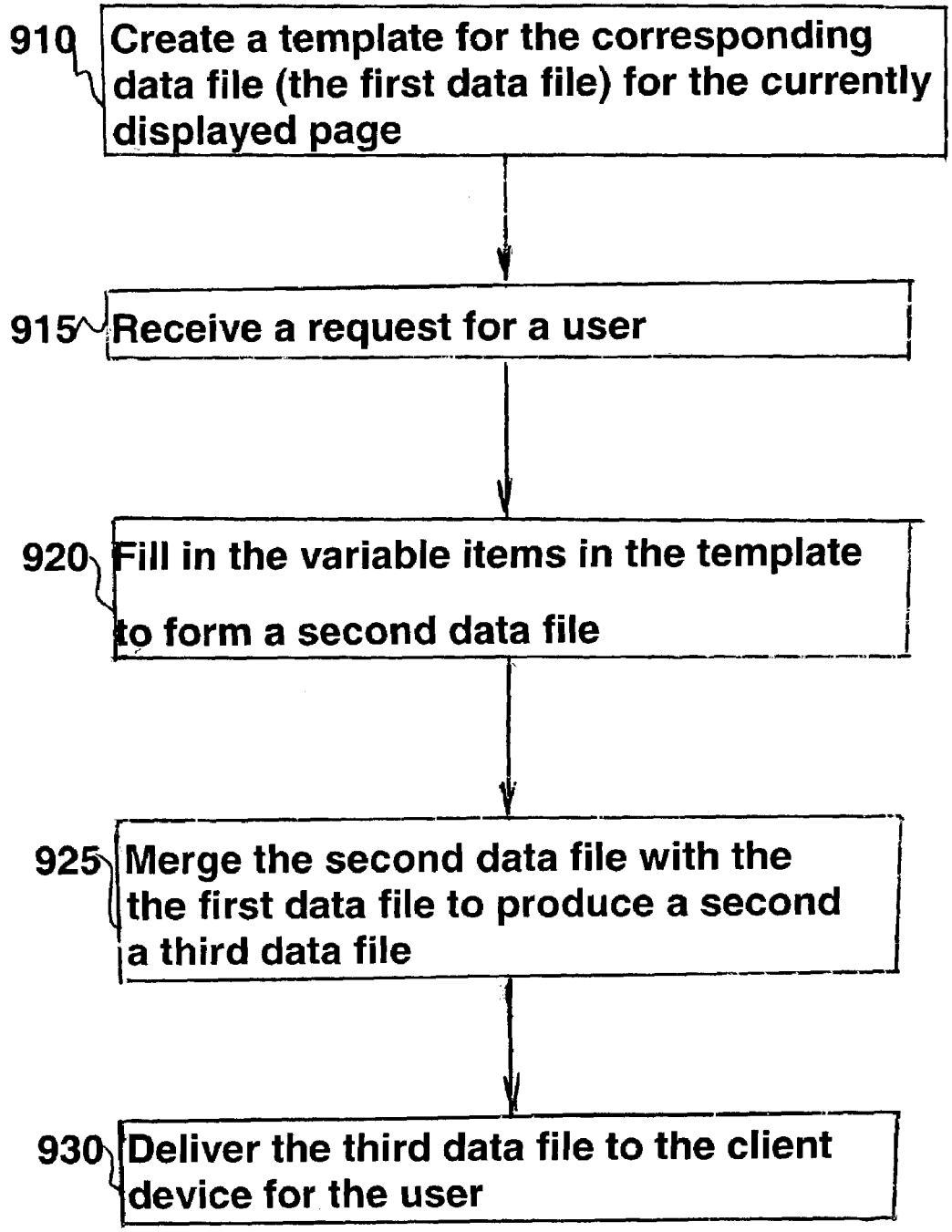
FIG. 5 illustrates a method used by the server for creating and merging the text file according to the principles of the invention.
Figure 6:
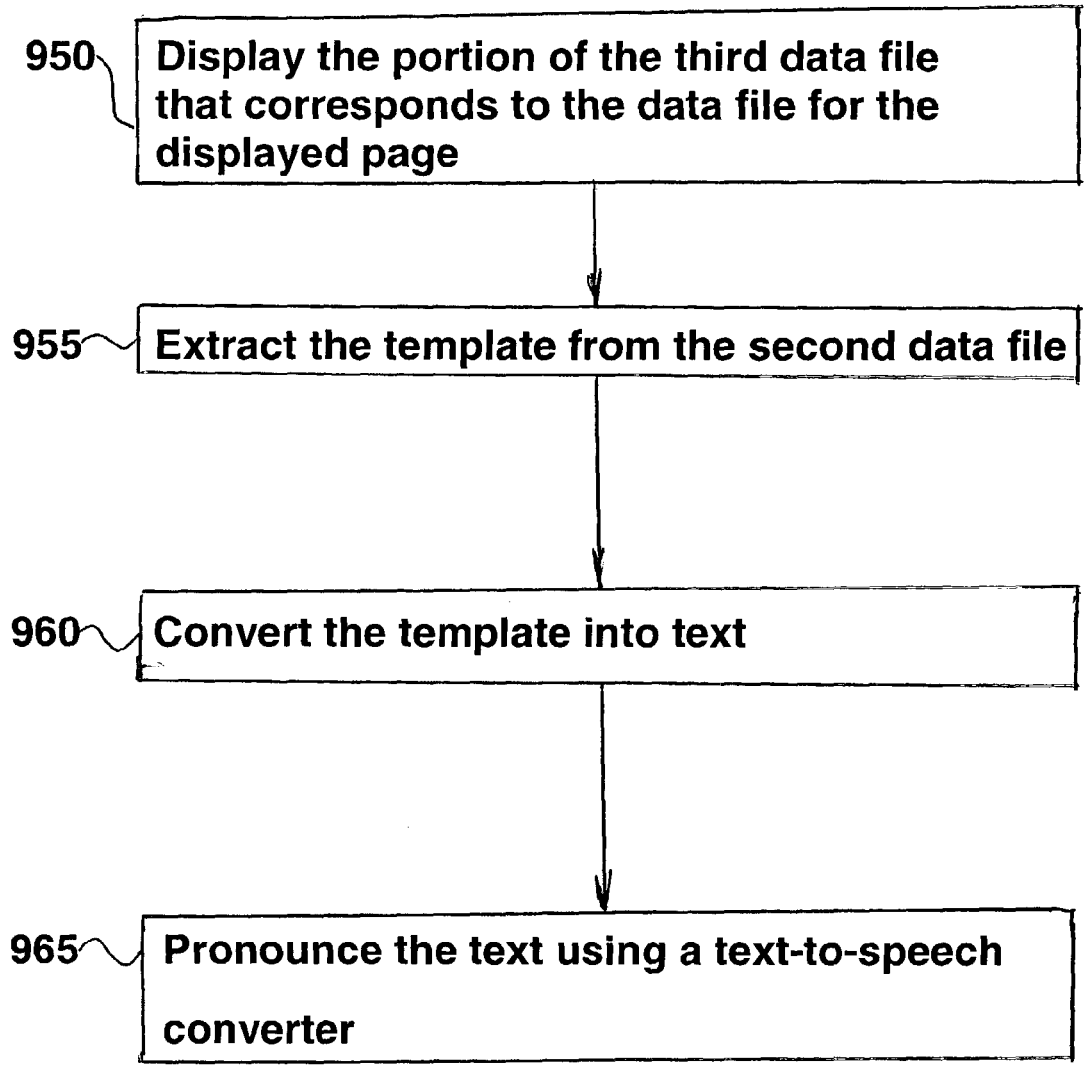
FIG. 6 illustrates a method for a client device when the merged data file is received.
Figure 1:
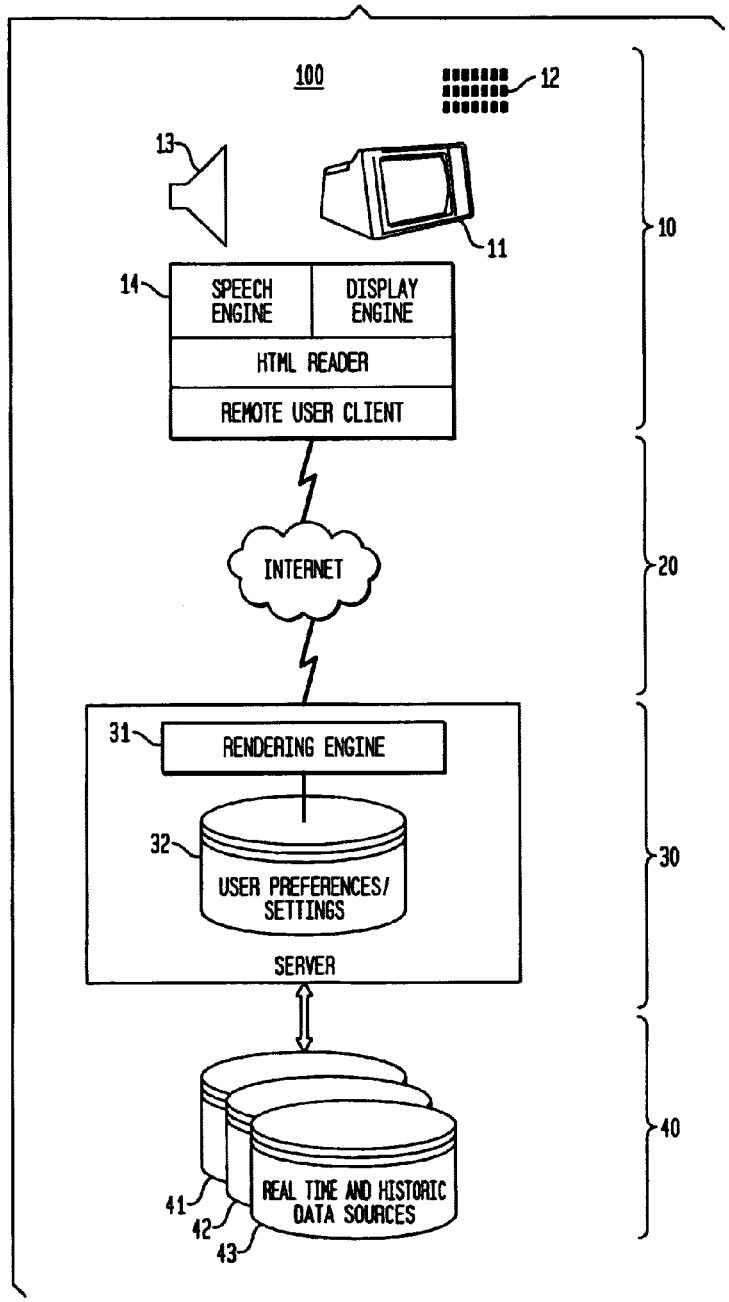
Figure 2:
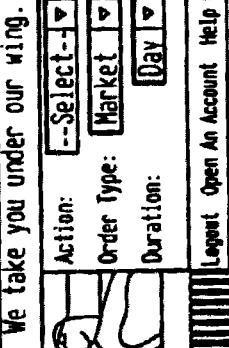
Figure 3:
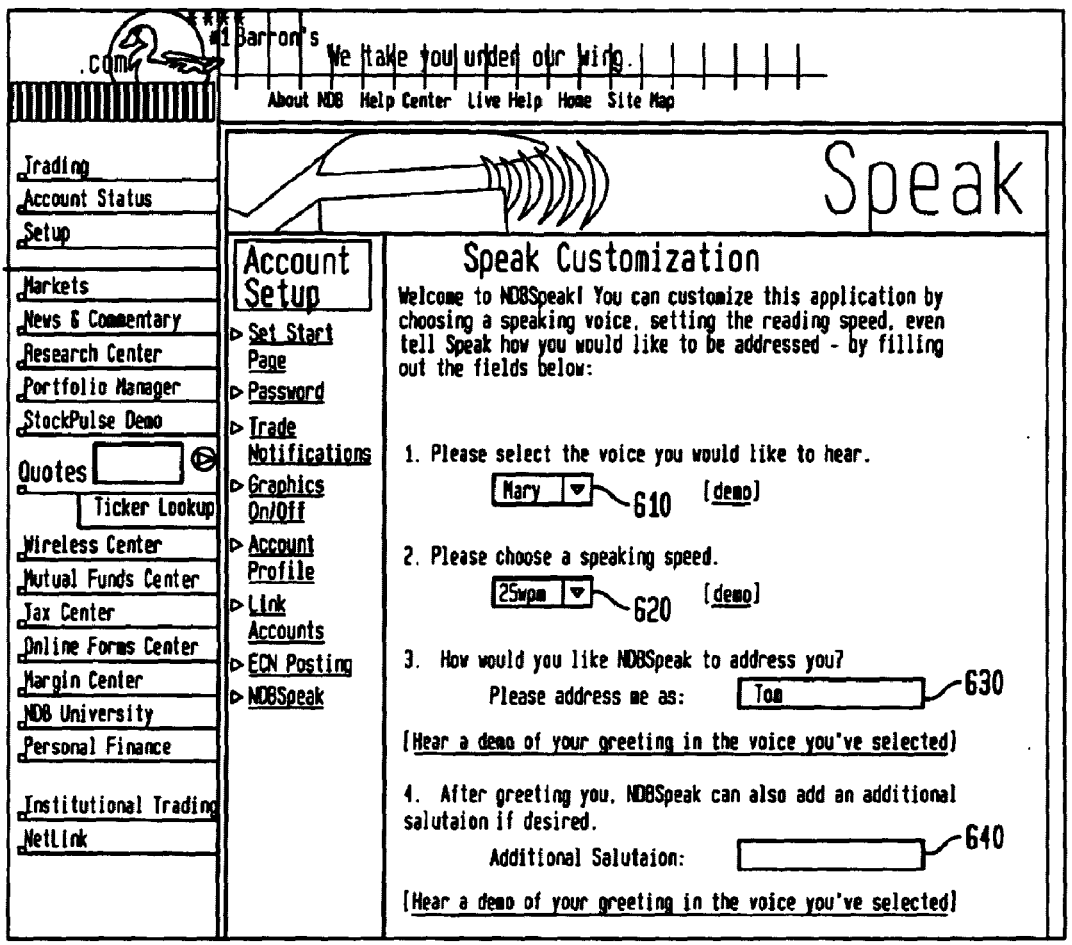
Figure 5:
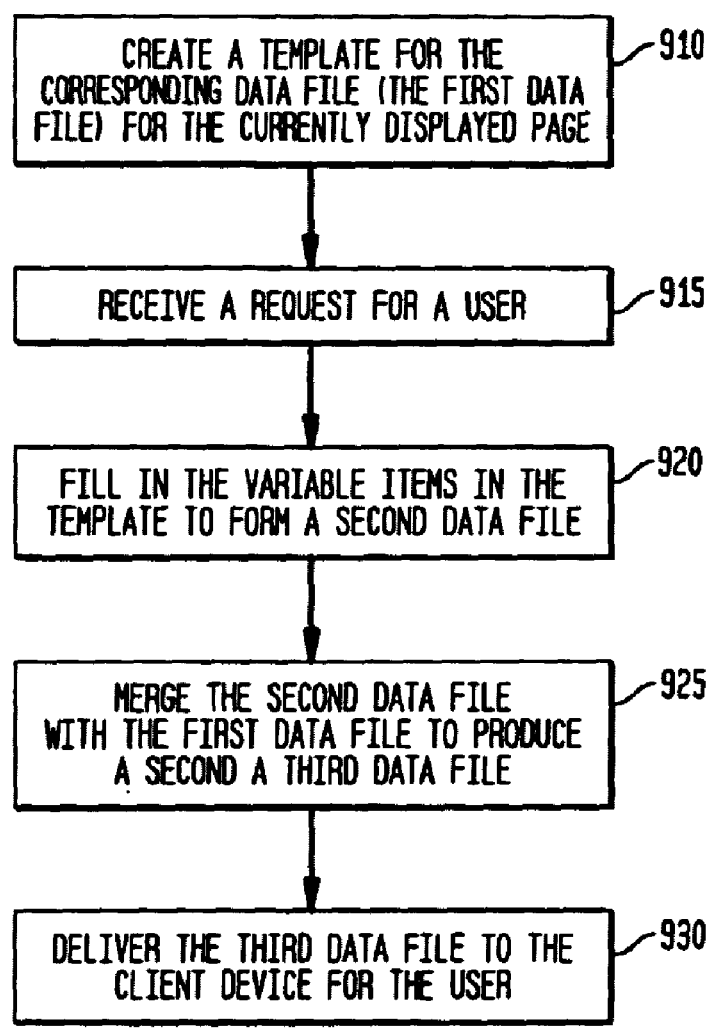
Figure 6:
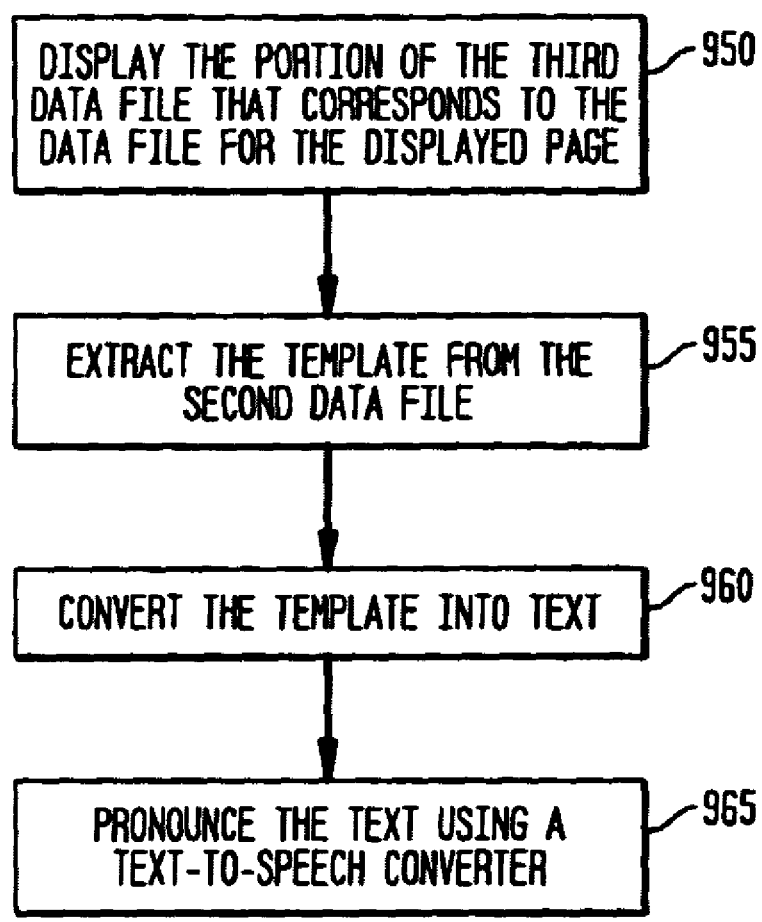

FIG. 5 illustrates a method used by the server in creating the merged file to be delivered to the client device and FIG. 6 illustrates how the client device handles the merged file. At block 910 in FIG. 5, the server pre-stores a template specifically designed for the data file (the first data file) associated with the currently displayed page. As described above, the template includes fixed items and variable items for user preferences, data from the first data file, and data that depends on time of access or time of the day information. At block 915, the server receives a request from a user for creating an audio version of the displayed page. Upon receiving the request, at block 920, the server fills in variable items. As indicated above, the server fills in the variable items to form a second data file by taking information from the currently displayed page, retrieving user preferences from the database 32, and deriving information that depends on the time of the access or the time of the day information. At block 925, the second data file is merged with the first data file to produce a third data file. Finally, at block 930, the server delivers the third data file to the client device using a particular communication protocol such as HTTP. As discussed above, step 915 can be moved after step 920 but before step 925.

Referring to FIG. 6, when the client device receives the third data file, the client device displays the first data file included in the third data file at step 950. Essentially, the display is not changed. The display function is performed by the display engine in the client device. At step 955, the speech engine 14 of the client device extracts the second data file from the third data file, and at step 960, the speech engine 14 converts the third data file into text. Finally, at step 965, the speech engine 14 pronounces the text using its text-to-speech converter. Although FIGS. 5 and 6 illustrate that both the first and the second data files are simultaneously delivered to the user, the system may give the user an option to deliver either only the first or the second data file.

The present invention is particularly well suited for use when monitoring information for particular content, such as waiting for a particular transaction to occur. Delivered information may be broadcast to the user upon delivery. Therefore, if the user is not at the client device but within hearing distance of the client device's audio output device, information can still be effectively communicated to the user.

The methods described above can also be implemented in a computer readable medium without deviating from the principles of the invention.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claim is reserved.

What is claimed is:

1. A method for delivery of information, said method comprising the steps:
   receiving natural human language textual information at a client computer, the natural human textual language being generated from tabular financial information in textual format and a template having other additional textual information;
   converting the natural human language textual information into an audio format at the client computer; and
   presenting the audio format information to a user.

2. The method according to claim 1, further comprising the step of presenting to the user the information in tabular textual format.

3. The method according to claim 2, wherein the information in tabular textual format is presented to the user using a graphical user interface capable of displaying text.

4. The method according to claim 1, wherein the natural human language textual information includes additional textual information, which additional textual information is in the template.

5. The method according to claim 4, wherein the additional textual information includes prefatory phrases.

6. The method according to claim 4, wherein the additional textual information includes transitional phrases.

7. The method according to claim 4, where the additional textual information includes user preferences.

8. A method for audio delivery of tabular textual financial information, said method comprising
   receiving by a client computer of information, the information including tabular textual information formatted for a user-specific populated textual template;
   converting said information into an audio format by the client computer using the populated textual template information; and
   presenting the audio format information to the user by the client computer.

9. The method according to claim 8, further comprising presenting the tabular textual format information to the user by the client computer.

10. A system for presenting tabular financial information to a user, the system comprising:
    a client computer including a processor in communication with associated memory and a communications interface, the processor also in communication with at least two different user interface devices;
    wherein the processor is configured for:
    receiving information in tabular format at the user's request through the communication interface;
    receiving additional textual template information through the communication interface;

presenting the tabular format information to the user by a first of the user interface devices;

converting the tabular format information to audio format suitable for presenting to the user by a second of the user interface devices, the converting step using the additional textual template information; and presenting the converted information to the user by the second of the user interface devices, the second user interface device being adapted to present audio.

11. The system according to claim 10, wherein the converting step includes converting the tabular format information into natural human speech.

12. The system according to claim 11, wherein the additional textual information includes a populated textual template for use in converting the tabular format information into natural human speech, the populated textual template including both fixed and variable format information.

13. A system for generating information, the system comprising:

a first computer including a processor in communication with associated memory, the first computer also in communication with one or more devices, wherein the processor is configured for:

populating a textual template based on a provided user's preferences;

receiving financial information in a textual format; and sending the populated textual template and information in textual format to the one or more devices.

14. The system according to claim 13, wherein the textual template is populated using fixed and variable format information regarding the provided user.

15. The system according to claim 13, further comprising:

converting the populated textual template into natural human language audio by the first computer, and presenting the audio to the provided user by the first computer.

16. A system for generating information, the system comprising:

a first computer including a processor in communication with associated memory, the first computer also in communication with one or more devices, wherein the processor is configured for:

populating a textual template based on a provided user's preferences;

receiving financial information in a tabular textual format;

converting the information in a textual format into information in a natural human language format using the populated textual template.

17. The system according to claim 16, wherein the processor is further configured for sending the information in a natural human language format to the one or more devices.

18. The system according to claim 17, further comprising converting the information in a natural human language format into an audio format by the one or more devices.

19. A system for generating information in an audio format, the system comprising:

a computer including a processor in communication with associated memory and in communication with an audio device, wherein the processor is configured for:

populating a textual template based on a provided user's preferences;

converting financial information in a tabular textual format into an audio format using the populated textual template; and communicating the converted audio information to the audio device.

20. The system according to claim 19, wherein the populated textual template includes fixed and variable textual information.

21. The system according to claim 19, wherein the textual information is in HTML format.

22. The system according to claim 19, wherein the audio format is a natural human language.

* * * * *

UNITED STATES PATENT AND TRADEMARK OFFICE
CERTIFICATE OF CORRECTION

PATENT NO. : 7,020,611 B2
APPLICATION NO. : 10/274685
DATED : March 28, 2006
INVENTOR(S) : Gilde It is certified that error appears in the above-identified patent and that said Letters Patent is hereby corrected as shown below:

Delete Title page illustrating figure, and substitute therefor, new Title page illustrating figure. (attached)

Delete drawing sheets 1-6, and substitute therefor, drawing sheets 1-6, with the attached sheets.

Signed and Sealed this

Tenth Day of October, 2006

JON W. DUDAS
*Director of the United States Patent and Trademark Office*

United States Patent
Gilde et al.

(10) Patent No.: US 7,020,611 B2
(45) Date of Patent: Mar. 28, 2006

(54) USER INTERFACE SELECTABLE REAL TIME INFORMATION DELIVERY SYSTEM AND METHOD

(75) Inventors: Hans Gilde, Brooklyn, NY (US); Steele Arbeeny, Guttenberg, NJ (US)

(73) Assignee: Ameritrade IP Company, Inc., (US)

(*) Notice: Subject to any disclaimer, the term of this patent is extended or adjusted under 35 U.S.C. 154(b) by 0 days.

(21) Appl. No.: 10/274,685

(22) Filed: Oct. 21, 2002

(65) Prior Publication Data
US 2003/0040912 A1 Feb. 27, 2003

Related U.S. Application Data

(63) Continuation of application No. 10/081,159, filed on Feb. 21, 2002, now abandoned.

(60) Provisional application No. 60/270,358, filed on Feb. 21, 2001.

(51) Int. Cl.
*G10L 21/00* (2006.01)

(52) U.S. Cl. .............. 704/270.1; 704/270; 704/275; 715/516; 715/517; 709/203; 709/201; 707/101; 707/102; 705/26; 705/27; 705/31

(58) Field of Classification Search .............. 345/804, 345/805, 968; 704/270.1, 235, 260, 270, 704/275; 715/517, 516, 730; 709/200, 203; 707/102, 101; 705/26, 27, 31, 35
See application file for complete search history.

(56) References Cited

U.S. PATENT DOCUMENTS

| | | | |
|---|---|---|---|
| 5,555,343 A * | 9/1996 | Luther | 704/260 |
| 5,587,902 A * | 12/1996 | Kugimiya | 704/2 |
| 5,594,809 A * | 1/1997 | Kopec et al. | 382/161 |
| 5,732,216 A * | 3/1998 | Logan et al. | 709/203 |
| 5,748,186 A * | 5/1998 | Raman | 715/500.1 |
| 5,915,001 A * | 6/1999 | Uppaluru | 379/88.22 |
| 5,970,499 A * | 10/1999 | Smith | 707/104.1 |
| 6,055,522 A * | 4/2000 | Krishna | 715/517 |
| 6,085,161 A * | 7/2000 | MacKenty et al. | 704/270 |
| 6,185,587 B1 * | 2/2001 | Bernardo | 707/513 |
| 6,199,099 B1 * | 3/2001 | Gershman et al. | 709/203 |
| 6,446,076 B1 * | 9/2002 | Burkey et al. | 707/102 |
| 6,453,290 B1 * | 9/2002 | Jochumson | 704/231 |
| 6,658,093 B1 * | 12/2003 | Langseth et al. | 379/88.17 |
| 2001/0013001 A1 * | 8/2001 | Brown | 704/270.1 |
| 2001/0039493 A1 * | 11/2001 | Pustejovsky | 704/235 |
| 2002/0103858 A1 * | 8/2002 | Bracewell | 709/203 |

* cited by examiner

*Primary Examiner*—Vijay Chawan
(74) *Attorney, Agent, or Firm*—Gibbons, Del Deo, Dolean, Griffinger and Vecchione

(57) ABSTRACT

An information delivery system including a client device and server interconnected by a network passes data files in accordance with a well known protocol. The server creates an audio version of a displayed page associated with a first data file. The audio version includes information from the first data file and other items, so that the information is presented in the form of conversation-like natural speech. The server merges the audio version and the data file to produce a second data file and delivers the second data file to the client device. Advantageously, the client device includes a speech synthesizer engine and a display so that the data file can be viewed using the first data file and/or heard by a user using the audio version, both included in the second data file.

22 Claims, 6 Drawing Sheets

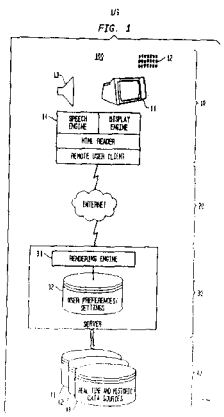

Good morning, Tom! Welcome to _____.com
　　As of two twenty-three AM TODAY, August 23, 2000, for account number
4RX221599: Your long market value is 66,420 dollars and 90 cents.
　　　　　　　　　　　　　　　　　840⟋　　　　　　　　⟍850

Your cash balance 12,309 dollars and 51 cents, and your total equity is
78,730 dollars and 41 cents.

Your have 0 dollars and 0 cents in your market account.

In total, your account value is 78,730 dollars and 41 cents, up 4325.44 cents
from "yesterday" closing balance of 1,820 dollars and 17 cents.

[If one or more of the below line items is non-zero:]
　　　Your cash purchasing limit is 0 dollars and 0 cents, and your margin buying
power is 0 dollars and 0 cents. Please note that these figures are based on the
previous trading day's close and are updated only when trading activity occurs.

[If a disclaimer about inability to get quotes for certain securities appears at
the bottom of the screen:]
　　　We are unable to obtain quotes for ____ in your account, so we have used its
closing price in calculating account value. Please refer to your screen for the specific
securities.

Please note the important disclaimers on your Account Value screen. If you
have any questions, feel free to call us, email us, or take advantage of live, online
customer help, through our iAnswer. Have a good [day].